United States Patent Office 3,812,089
Patented May 21, 1974

3,812,089
PRODUCTION OF OLEFIN POLYMERS
Kijuro Tashiro, Masuzo Yokoyama, and Shoji Kitazume, Ami-machi, Japan, assignors to Mitsubishi Petrochemical Company Limited, Tokyo-to, Japan
No Drawing. Filed Dec. 21, 1970, Ser. No. 100,434
Claims priority, application Japan, Dec. 28, 1969, 45/105,108
Int. Cl. C08f 1/56, 3/10
U.S. Cl. 260—93.7                    4 Claims

ABSTRACT OF THE DISCLOSURE

At least one olefin is polymerized by contact with a catalyst comprising a combination of (1) a reaction product insoluble in hydrocarbons, prepared by reacting the two essential components of a Ziegler-type catalyst and at least one metal halide compound and (2) an organic metal compound of a metal of Group I, II, or III of the Periodic Table. The above metal halide compound is a halide of Li, K, Ca, Fe, Ga, Zr, Mo, Rh, Ag, Sn, Sb, Ba, La, Ce, Hf, Au, Tl, or Th.

BACKGROUND OF THE INVENTION

This invention relates generally to polymers and more particularly to processes for producing crystalline polymers in high yields. More specifically the invention relates to a new and advanced process for producing olefin polymers, a prime feature of the process being a novel method of adjusting the composition of the catalyst used therein.

Throughout this disclosure, including the appended claims, the terms "polymers" and "polymerization" are intended to include, respectively, "homopolymers" and "copolymers" and "homopolymerization" and "copolymerization."

Catalysts for polymerization of olefins comprising essentially combinations of compounds of metals selected from metals of Groups IV-A, V-A, and VI-A of the Periodic Table and organic metal compounds of metals selected from Groups I, II, and III of the Periodic Table are known as so-called Ziegler-type catalysts. Among these catalysts, those comprising combinations of titanium halides as the first catalyst component and organic aluminum compounds as the second catalyst component are representative examples and are widely used in the polymerization of α-olefins, especially in the production of polypropylenes.

A known method of preparing a catalyst of this nature comprising essentially of a combination of the above mentioned first and second components comprises causing the compounds constituting the first and second compounds to react beforehand thereby to produce a reaction product which is insoluble in hydrocarbons (the metal of the first component, in general, being partially reduced) and combining this reaction product with the compound constituting the second component. Thus, catalysts each prepared by combining the hydrocarbon-insoluble reaction product formed from a titanium tetrahalide, for example, $TiCl_4$, and an organic aluminum compound with an organic aluminum compound are known.

However, according to the results of our experiments, for example, when a catalyst system comprising triethylaluminum and titanium trichloride is used in the homopolymerization of propylene, the matter or fraction insoluble in boiling heptane with respect to the total polymer formed, that is, crystalline polymer, is from 70 to 85 percent. Furthermore, when a catalyst system comprising diethylaluminum chloride and titanium trichloride is used, the fraction insoluble in boiling heptane is from 85 to 90 percent (the proportion of this fraction insoluble in boiling heptane being referred to as the isotactic index (I.I.)).

Furthermore, in the production of a copolymer from two or more monomers as, for example, in the case of copolymerization of ethylene with propylene, an increase in the ethylene content causes an abrupt increase in by-product quantity of the non-crystalline copolymer, whereby the yield of the crystalline polymers drops remarkably, as disclosed by G. Bier (AngeW chem. 73, 186 (1961)).

According to the results of practice we have carried out, in the case where the ethylene content in the ethylene-propylene copolymer obtained is 2 percent, the use of a catalyst system comprising triethylaluminum and titanium trichloride results in a fraction insoluble in boiling heptane of a quantity which is from 40 to 60 percent relative to the total polymer formed. Furthermore, when a catalyst system comprising diethylaluminum chloride and titanium trichloride is used, the boiling heptane-insoluble fraction is from 55 to 75 percent.

The fraction soluble in boiling heptane is ordinarily non-crystalline. At present, no effective use for this non-crystalline polymer is known. Furthermore, the by-production of this unnecessary non-crystalline polymer during the production of crystalline polymers gives rise not only to an unnecessary consumption of monomers but also to industrially great disadvantages such as the necessity of extracting the non-crystalline polymer from the total polymer formed, which in turn gives rise to complication of the process and the necessity of increasing the capacity or number of machine units of the apparatus.

Furthermore, when the above mentioned proportion of the frarction soluble in boiling heptane relative to the total polymer formed exceeds 50 percent, the production operation is impaired in various ways although this differs with the process. In the ordinary process for producing polyolefins, an increase in the viscosity of the polymer slurry occurs and, together with other changes, causes difficulty in removing heat from the polymerization vessel, clogging of the piping, lowering of the capacity of the apparatus, and other deleterious results until commercial production finally becomes practically impossible.

Accordingly, the discovery of a catalyst system whereby the proportion of the non-crystalline polymer formed is small would have very great industrial worth. However, despite the small proportion of the non-crystalline polymer formed, such a catalyst system cannot be advantageously utilized on an industrial basis if its use gives rise to adverse results such as a serious effect on the molecular weight of the polymer produced, a lowering of the polymerization rate, and a lowering of the bulk density of the solid polymer.

SUMMARY OF THE INVENTIION

It is an object of the present invention to provide a relatively simple and economically feasible process for producing crystalline polyolefins of high molecular weights in high yields without imparting a great effect on the polymerization activity. This object and other objects have been achieved in accordance with this invention by introducing into the first catalyst component a specific metal halide compound as defined hereinafter.

According to the present invention, briefly summarized, there is provided a process for producing olefin polymers in which at least one olefin is caused to contact a specific catalyst and thereby to polymerize, this catalyst comprising essentially a combination of (1) a reaction product insoluble in hydrocarbons, prepared by causing the two essential components (A) and (B) of a Ziegler-type catalyst, as described above, and a metal halide compound (C) to react and (2) an organic metal compound of a metal of Group I, II, or III of the Periodic Table.

A feature of this invention is that the above specified metal halide compound (C) is a member selected from the group consisting of compounds representable by the general formulas $LiX$, $KX$, $CaX_2$, $FeX_3$, $GaX_3$, $ZrX_4$, $MoX_5$, $RhX_3$, $AgX$, $SnX_2$, $SbX_3$, $BaX_2$, $LaX_3$, $CeX_3$, $HfX_4$, $AuX_3$, $TlX_3$, and $ThX_4$, where X designates a halogen.

The nature, principle, and utility of the invention will be more clearly apparent from the following detailed description beginning with general aspects and features of the invention and concluding with specific examples of practice illustrating preferred embodiments of the invention.

DETAILED DESCRIPTION

By using a catalyst comprising a combination of a first catalyst component which is a product insoluble in hydrocarbons formed from the aforestated compounds (A), (B), and (C) and a second catalyst component of the aforestated character, it is possible to increase the polymerization yield without greatly lowering the rate of formation of stereospecific polymers.

More specifically, when the reaction rate constant V (as defined hereinafter) in the ordinary case wherein the component (C) is not used and the total I.I. (as defined hereinafter) representing stereospecific characteristic are 30.4 and 92.8, respectively, it is possible by using the component (C) to raise the total I.I. above 94 without a lowering of V below approximately 30. Particularly when halides of Au, Ga, Fe, Tl, Zr, Sb, Li, Th, and La from among the halides enumerated hereinbefore are added, the total I.I. is increased to a value as high as from 95 to 98. Furthermore, the resulting polymers formed are in the form of spherical particles having the features of a large average particle size and a narrow particle size distribution.

Thus, the catalyst according to this invention is one wherein, in the preparation of the known first catalyst component from known compounds (A) and (B), a compound (C) is introduced thereinto. These compounds (A) and (B) are known to those skilled in the art as starting materials for preparation of catalysts of the instant class. Representative examples of compounds (A) are titanium tetrahalides, particularly titanium tetrachloride, while representative examples of compounds (B) are compounds representable by the general formula $AlR_nX_{3-n}$, where: R is an alkyl, aryl, aralkyl, alkaryl, or cycloalkyl group, particularly an alkyl group with 4 or fewer carbon atoms; X is a halogen, particularly chlorine, and n is 1, 1.5, 2, or 3.

The compound (C) is a metal halide compound as stated hereinbefore. Specific examples of this compound are $AuCl_3$, $AuBr_3$, $AuI_3$, $GaCl_3$, $GaBr_3$, $GaI_3$, $FeCl_3$, $FeBr_3$, $FeI_3$, $TlCl_3$, $TlBr_3$, $TlI_3$, $ZrCl_4$, $ZrBr_4$, $ZrI_4$, $SbCl_4$, $SbBr_3$, $SbI_4$, $LiCl$, $LiBr$, $LiI$, $LaCl_3$, $LaBr_3$, $LaI_3$, $ThCl_4$, $ThBr_4$, $ThI_4$, $KCl$, $CaCl_2$, $MoCl_5$, $RhCl_3$, $AgCl$, $AgBr$, $AgI$, $SnCl_2$, $SnBr_2$, $SnI_2$, $BaCl_2$, $BaBr_2$, $BaI_2$, $CeCl_3$, $CeBr_3$, $CeI_3$, $HfCl_4$, $HfBr_4$, and $HfI_4$. These compounds can be used singly or as mixtures of two or more thereof.

The proportions with which the compounds (A), (B), and (C) are used are determined in accordance with necessity in each case. Generally speaking, the weight ratio of compound (A) to compound (B) is essentially the same as that known in the art, being from 1:0.2 to 1:8, for example, while the quantity of the metal halide compound (C) is such that the weight ratio of compound (A) to compound (C) is, for example, of the order of from 1:0.001 to 1:0.5.

The reaction of the compounds (A), (B), and (C) can be carried out by any process which enables these compounds to undergo uniform reaction to a sufficient extent. Specific examples of suitable processes are as follows.

(1) The process which comprises adding and admixing a metal halide compound with a $TiCl_4$ solution in the presence or absence of an inert organic diluent and continuously dropping a dialkylaluminum halide solution into the resulting mixture thereby to reduce $TiCl_4$.

(2) The process which comprises continuously dropping a dialkylaluminum halide solution admixed with a metal halide compound added thereto into a $TiCl_4$ solution in the presence or absence of an inert organic diluent thereby to cause reduction.

(3) The process which comprises continuously dropping a dialkylaluminum halide solution into a $TiCl_4$ solution in the presence or absence of an inert organic diluent and adding and admixing a metal halide compound at an intermediate point in the dropping procedure thereby to cause reduction.

(4) The process which comprises continuously dropping a dialkylaluminum halide solution into a $TiCl_4$ solution in the presence or absence of an inert organic diluent and, upon completion of the dropping procedure, adding and admixing the above specified metal halide compound.

(5) The process in which the addition procedure in any one of the preceding processes is reversed.

In this case, the dropping procedure is carried out continuously for at least 30 minutes at a temperature in the range of from −50 to +100 degrees C. Furthermore, it is preferable to maintain the reaction mixture after completion of the dropping step at this temperature for at least 30 minutes thereby to cause completion of the reaction of the three compounds (A), (B) and (C).

A solid product formed in this manner can be used immediately as the first catalyst component. However, in order to derive excellent performance from the catalyst for producing stereospecific polymers of α-olefins such as propylene, this product thus formed is subjected further to a treatment as described below, whereby even more desirable results are obtained.

One such further treatment comprises preventing the existence of an organic aluminum compound, such as ethylaluminum dichloride, which may be considered to be disadvantageous in the case where a high-performance catalyst is especially desired. Accordingly, in the case where ethylaluminum dichloride has been formed because of the use of diethylaluminum chloride as a reducing agent and is in admixed state in the product formed in the reduction reaction, excellent results are attained by thoroughly washing a slurry of this reduction reaction product with an inert organic solvent (preferably a fresh solvent which has been deaerated and sufficiently dried).

Another measure for preventing ethylaluminum dichloride from reduction reaction product is to cause it to react with an equal mole quantity of triethylaluminum thereby to convert ethylaluminum dichloride into diethylaluminum chloride.

Another treatment for obtaining a catalyst of especially high performance is a heat treatment. More specifically, after the product of the reduction reaction has been amply washed, this solid reaction product is heated for at least one hour at a temperature in the range of from 60 to 200 degrees C., preferably from 110 to 170 degrees C., whereupon the yield of the polymer formed per gram of the solid titanium compound increases, and, moreover, the rate of formation of the crystalline polymer increases.

The process of polymerization of α-olefins with the use of the first catalyst component according to this invention does not differ essentially for an ordinary α-olefin polymerization process in which use is made of an ordinary first catalyst component wherein the aforedescribed metal halide compound (C) is not utilized. Accordingly, it is possible, for example, to use for the second catalyst component an organic aluminum compound representable, for example, the general formula $AlR_nX_{3-n}$ (wherein R, X, and n are as defined hereinbefore). Specific examples of this organic aluminum compound are triethylaluminum, diethylaluminum chloride, ethylaluminum sesquichloride, di-n-propylaluminum chloride, and diisobutylaluminum chloride.

As a solvent for use in the polymerization reaction, a saturated aliphatic or aromatic hydrocarbon, such as hexane, heptane, octane, cyclohexane, benzene, and toluene, are used, either singly or as mixture of two or more thereof. The polymerization temperature is of the order of from room temperature to 110 degrees C., preferably from 50 to 100 degrees C. It is possible to add to reaction system a molecular weight adjusting agent such as hydrogen and other additives as, for example, methyl methacrylate, and benzoic acid esters (as disclosed in U.S. applications Ser. Nos. 866,082, now Pat. No. 3,622,552, and 640,409, and now abandoned, filed on Oct. 3, 1969 and May 22, 1967, entitled, "Process for Producing Crystalline Olefin Polymers and Catalyst Compositions Therefor" and "Process For Producing Crystalline Homopolymers and Copolymers of Olefin."

Examples of α-olefins which are polymerizable by a polymerization system as described above are ethylene, propylene, and butene-1. These α-olefins are subjected to polymerization either singly or as a mixture of two or more thereof.

In order to indicate still more fully the nature and utility of the invention, the following specific examples of practice constituting preferred embodiments of the invention, results thereof, and a reference example are set forth, it being understood that these examples are presented as illustrative only, and that they are not intended to limit the scope of the invention.

EXAMPLE 1

(1) Preparation of the first catalyst component

A three-neck flask of 1-liter purged with nitrogen was charged with 17.3 ml. of $TiCl_4$, to which 0.5 gram (g.) of $AuCl_3$ was further added and admixed, the weight ratio $AuCl_3/TiCl_4$ being 0.017. The resulting solution was cooled to $-5$ degrees C. A solution containing 20.0 ml. of $AlEt_2Cl$ in 60.0 ml. of heptane was continuously dropped onto the solution thus cooled over a period of 4 hours in a nitrogen atmosphere as the solution was maintained at the above stated temperature, the mole ratio Al/Ti being one (unity). As a result, a compound insoluble in hydrocarbons was formed.

In order to bring this solid forming reaction to completion, agitation of the reactants was continued for a further 2 hours at the above stated temperature. The resulting slurry was then separated by decantation, and the precipitate was washed twice with heptane and then heat treated for 2 hours by means of an oil bath maintained at a temperature of 155 degrees C. in an atmosphere of nitrogen.

In this manner, approximately 30 g. of a solid formed product containing titanium was obtained.

(2) Polymerization of propylene

A portion of the solid formed product obtained in the above described manner was used as a component of a catalyst for polymerization. More specifically, a stainless-steel autoclave of 0.5-liter having an agitator and a temperature-control device was purged by several repeated cycles of alternate evacuation and nitrogen substitution and was then charged with 250 ml. of heptane, 0.25 g. of $AlEt_2Cl$, and 0.23 g. of the above mentioned solid formed product containing titanium compounds.

After the interior temperature of the autoclave was raised to 70 degrees C., polymerization of the contents thereof was carried out for 2 hours as propylene was supplied thereinto at a flowrate such that a constant pressure of 4 kg./cm.², gauge, was maintained. Upon completion of the polymerization, 100 ml. of butanol was added to the resulting process materials, and the resulting process batch was treated for 2 hours at 70 degrees C. The resulting polymer slurry was separated by filtration, and a polymer cake thus obtained was dried for 6 hours under vacuum at 70 degrees C. As a result, 64.7 g. of a white solid polymer of crystalline structure was obtained.

This crystalline polymer was in the form of a powder consisting of spherical particles, the proportion of which of particle size less than 100 mesh was less than 3 percent, the particle-size distribution being narrow.

This polymer was subjected to 6 hours of extraction with boiling n-heptane, whereupon 0.9 g. of a noncrystal- line polymer was extracted. On one hand, the filtrate resulting from the filtration was evaporated to dryness, whereupon 0.3 g. of a noncrystalline polymer was found to be contained in the filtrate.

Accordingly, the proportion of the component insoluble in boiling n-heptane with respect to the total formed polymer (hereinafter refered to simply as "total I.I.") was calculated to be 98.2 percent, as follows.

$$\frac{64.7-0.9}{64.7+0.3} \times 100 = 98.2 \text{ percent}$$

Furthermore, the reaction speed V (polymer (g.)/Ti compound (g.).polymerization time (hr.).propylene partial pressure (atmospheres)) was calculated as follows.

$$V = \frac{64.7+0.3}{0.23 \times 2 \times 4.44}$$
$$= 31.8$$

EXAMPLES 2 THROUGH 9

First catalyst components were prepared generally in accordance with Example 1 except for the addition and admixing of various metal halide compounds in the step of reducing $TiCl_4$ with $AlEt_2Cl$, and polymerization with these catalyst components was carried out experimentally, whereupon the results indicated in Table 1 were obtained.

TABLE 1

| | Preparation of first catalyst component | | Polymerization | | | | |
|---|---|---|---|---|---|---|---|
| Ex. No. | Halide compound | Halide TiCl₄ | Formed polymer per g. of first component (g.) | Product I.I., percent | Total I.I., percent | Bulk densiy | V |
| 2 | GaCl₃ | 0.017 | 280 | 98.7 | 96.9 | 0.38 | 31.5 |
| 3 | FeCl₃ | 0.017 | 282 | 98.4 | 96.7 | 0.39 | 31.7 |
| 4 | TlCl₃ | 0.017 | 272 | 98.7 | 95.8 | 0.43 | 30.6 |
| 5 | ZrCl₄ | 0.017 | 309 | 97.9 | 95.7 | 0.39 | 34.8 |
| 6 | SbCl₃ | 0.017 | 288 | 99.1 | 95.7 | 0.41 | 32.4 |
| 7 | LiCl | 0.017 | 263 | 99.4 | 97.8 | 0.41 | 29.6 |
| 8 | ThCl₄ | 0.017 | 304 | 98.2 | 95.1 | 0.42 | 34.2 |
| 9 | LaCl₃ | 0.017 | 283 | 99.2 | 97.6 | 0.43 | 31.9 |

EXAMPLE 10

(1) Preparation of the first catalyst component

A three-neck flask of 1-liter capacity was purged with nitrogen and then charged with 17.3 ml. of $TiCl_4$, to which 0.5 g. of KCl was further added and admixed, the weight ratio $KCl/TiCl_4$ being 0.017, and the resulting solution was cooled to $-5$ degrees C. To this solution, 20.0 ml. of $AlEt_2Cl$ and 600 ml. of heptane were added by continuously dropping in a nitrogen atmosphere over a period of 4 hours as the above stated temperature was maintained, the mol ratio Al/Ti being one (unity). As a result, a compound insoluble in hydrocarbons was formed.

In order to bring this reaction to completion, agitation of the reactants was continued for a further 2 hours at the same temperature. The resulting slurry was then separated by decantation, and the precipitate was washed twice with heptane and then heat treated for 2 hours by means of an oil bath maintained at 155 degrees C. in a nitrogen atmosphere.

In this manner, approximately 30 g. of a solid formed product was obtained.

(2) Polymerization of propylene

A portion of the solid formed product thus obtained was used as a component of a catalyst for polymerization. More specifically, an autoclave of the specification and in the purged state as set forth in Example 1 was charged with 250 ml. of heptane, 0.25 g. of $AlEt_2Cl$, and 0.124 g. of the above mentioned solid formed product containing titanium.

These process materials were subjected to the same process as specified in Example 1, whereupon 36.7 g. of a white solid polymer of crystalline structure was obtained.

This crystalline polymer was in the form of a powder consisting of spherical particles, the proportion of which of particle size less than 100 mesh was less than 2 percent, the particle-size distribution being narrow.

This polymer was subjected to 6 hours of extraction with boiling n-heptane, whereupon 0.7 g. of a noncrystalline polymer was extracted. On one hand, the filtrated resulting from the filtration was evaporated to dryness, whereupon 0.3 g. of a noncrystalline polymer was found to be contained in the filtrate.

Accordingly, the total I.I. was calculated to be 94.9 percent, as follows:

$$\frac{36.7 - 0.7}{36.7 + 1.2} \times 100 = 94.9$$

The reaction rate V was calculated to be 34.4.

EXAMPLES 11 THROUGH 19

First catalyst components were prepared generally in accordance with Example 10 except for the addition and admixing of various halide compounds in the step of reducing $TiCl_4$ with $AlEt_2Cl$, and polymerization with these catalyst components was carried out experimentally, whereupon the results indicated in Table 2 were obtained.

TABLE 2

| | Preparation of first catalyst component | | Polymerization | | | | |
|---|---|---|---|---|---|---|---|
| Ex. No. | Halide compound | Halide TiCl₄ | Formed polymer per g. of first component (g.) | Product I.I., percent | Total I.I., percent | Bulk density | V |
| 11 | CaCl₂ | 0.017 | 267 | 98.4 | 94.7 | 0.38 | 30.1 |
| 12 | MoCl₅ | 0.068 | 267 | 98.7 | 96.5 | 0.41 | 30.1 |
| 13 | MoCl₅ | 0.102 | 309 | 99.0 | 94.8 | 0.38 | 34.7 |
| 14 | AgCl | 0.017 | 264 | 98.3 | 94.5 | 0.38 | 29.7 |
| 15 | SnCl₂ | 0.051 | 273 | 98.2 | 94.6 | 0.39 | 30.7 |
| 16 | CeCl₃ | 0.017 | 281 | 97.5 | 94.9 | 0.42 | 31.6 |
| 17 | HfCl₄ | 0.017 | 278 | 98.0 | 94.3 | 0.40 | 31.3 |
| 18 | RhCl₃ | 0.017 | 283 | 98.3 | 94.7 | 0.39 | 31.9 |
| 19 | BaCl₂ | 0.07 | 268 | 98.3 | 94.6 | 0.41 | 30.2 |

REFERENCE EXAMPLE

Without adding a halide compound in the reduction of $TiCl_4$ with $AlEt_2Cl$, the procedure set forth in Example 1 was carried out, in all other respects, under the same conditions and with the same process to prepare a solid catalyst and to carry out polymerization under the same conditions.

As a result, 270 g. per gram of the titanium compound of a white polymer was obtained. The product I.I. of this polymer was 98.1 percent, and the total I.I. thereof was 92.8 percent. The density of this polymer was 0.39. The reaction rate V was 30.4.

What is claimed is:

1. In the production of crystalline propylene polymers wherein propylene is contacted with a catalyst at a temperature of about 50° to 100° C. and thereby polymerized, the improvement wherein said catalyst comprises esentially a combination of
    (1) a reaction product insoluble in hydrocarbons, prepared by reacting
        a compound (A) which is a titanium tetrahalide, an organoaluminum compound (B) of the formula $AlR_nCl_{3-n}$, wherein R is an alkyl group containing up to 4 carbons and n is 1.5, 2 or 3, and
        a metal chloride (c) which is $FeC_3$, the weight ratio of said organoaluminum compound (B) to said titanium tetrahalide (A) being from 1:0.2 to 1:8 and the weight ratio of said titanium tetrachloride (A) to said metal chloride (C) being of the order of 1:0.001 to 1:0.5,
    washing the resultant, hydrocarbon insoluble reaction product with an hydrocarbon and then heating the resulting hydrocarbon insoluble product at a temperature of about 60° to 200° C., and
    (2) an organometallic compound of a member selected from the group consisting of metals of Groups I, II, and III of the Periodic Table.

2. A process for producing propylene polymers according to claim 1 in which said organoaluminum compound (B) and said organometallic compound (2) are each a dialkylaluminum monochloride.

3. A process for producing crystalline propylene polymers which comprises contacting propylene at a temperature of about 50° to 100° C. with a catalyst comprising a combination of:
    (1) a reaction product insoluble in hydrocarbons, prepared by reacting:
        (A) titanium tetrachloride
        (B) an organoaluminum compound selected from the group consisting of dialkylaluminum monochloride, each alkyl having from 1 to 4 carbon atoms, and trialkyl aluminum each alkyl having from 1 to 4 carbon atoms, and
        a metal chloride (C) which is $FeCl_3$ the weight ratio of said organoaluminum compound (B) to said titanium tetrahalide (A) being from 1:0.2 to 1:8 and the weight ratio of said titanium tetrachloride (A) to said metal chloride (C) being of the order of 1:0.001 to 1:0.5,
    washing the resultant, hydrocarbon insoluble reaction and then
    heating the resulting reaction product insoluble in hydrocarbons at a temperature of from 60° C. to 200° C., and
    (2) an organoaluminum compound selected from the group consisting of dialkylaluminum monochloride each alkyl having from 1 to 4 carbon atoms, and trialkyl aluminum, each alkyl having from 1 to 4 carbon atoms.

4. A process for producing propylene polymers according to claim 3 in which each of said organoaluminum compounds (B) and (2) is a dialkylaluminum monochloride.

References Cited

UNITED STATES PATENTS

| 3,058,963 | 10/1962 | Vandenberg | 260—94.9 E |
| 3,676,418 | 7/1972 | Tashiro et al. | 260—94.9 C |
| 2,909,510 | 10/1959 | Thomas | 260—93.7 |
| 3,143,537 | 8/1964 | Hagemeyer et al. | 260—93.7 |
| 3,207,734 | 9/1965 | Tsunoda et al. | 260—93.7 |
| 3,450,682 | 6/1969 | Sasaki et al. | 260—94.9 |
| 2,980,664 | 4/1961 | Stuart | 260—93.7 |

FOREIGN PATENTS

| 884,249 | 12/1961 | Great Britain | 260—94.9 E |
| 943,199 | 12/1963 | Great Britain. | |
| 895,595 | 5/1962 | Great Britain. | |

JOSEPH L. SCHOFER, Primary Examiner

C. J. SMITH, Assistant Examiner

U.S. Cl. X.R.

252—429 C; 260—94.9 E